United States Patent [19]
Baumann

[11] Patent Number: 6,038,066
[45] Date of Patent: Mar. 14, 2000

[54] ARRANGEMENT FOR GENERATING A DEFINED LONGITUDINAL CHROMATIC ABERRATION IN THE OPTICAL BEAM PATH OF A CONFOCAL MICROSCOPE

[75] Inventor: Hans-Georg Baumann, Jena, Germany

[73] Assignee: Carl Zeiss Jena GmbH, Jena, Germany

[21] Appl. No.: 08/824,825

[22] Filed: Mar. 26, 1997

[30] Foreign Application Priority Data

Mar. 30, 1996 [DE] Germany .............................. 196 12 846

[51] Int. Cl.[7] .................................................. G02B 21/00
[52] U.S. Cl. ............................................ 359/368; 359/381
[58] Field of Search ..................................... 359/368–369, 359/373–390, 629, 641, 642; 351/216–218, 233–236

[56] References Cited

U.S. PATENT DOCUMENTS

| | | | |
|---|---|---|---|
| 3,458,244 | 7/1969 | Klein ........................................ | 359/380 |
| 4,329,024 | 5/1982 | Rogers ...................................... | 359/629 |
| 4,451,126 | 5/1984 | Riesenberg et al. ..................... | 359/381 |
| 4,563,062 | 1/1986 | Kanatani .................................. | 359/379 |
| 4,946,265 | 8/1990 | Shimizu et al. ......................... | 359/381 |
| 5,161,052 | 11/1992 | Hill .......................................... | 359/377 |
| 5,260,578 | 11/1993 | Bliton et al. ............................. | 359/368 |

OTHER PUBLICATIONS

Zeiss Axiotron 2, Technical Manual—Confocal Scan Module (CSM) Revision 1.1/Dec. 1995.

*Primary Examiner*—Thong Nguyen
*Attorney, Agent, or Firm*—McAulay Nissen Goldberg Kiel & Hand, LLP

[57] ABSTRACT

An arrangement for generating a defined longitudinal chromatic aberration in a beam path of a confocal microscope. The arrangement includes using a confocal microscope with a microscope objective, and supplementary optics which are arranged in the imaging beam path of the microscope objective. The supplementary optics include at least two dual lens optical elements for generating the longitudinal chromatic aberration.

4 Claims, 3 Drawing Sheets

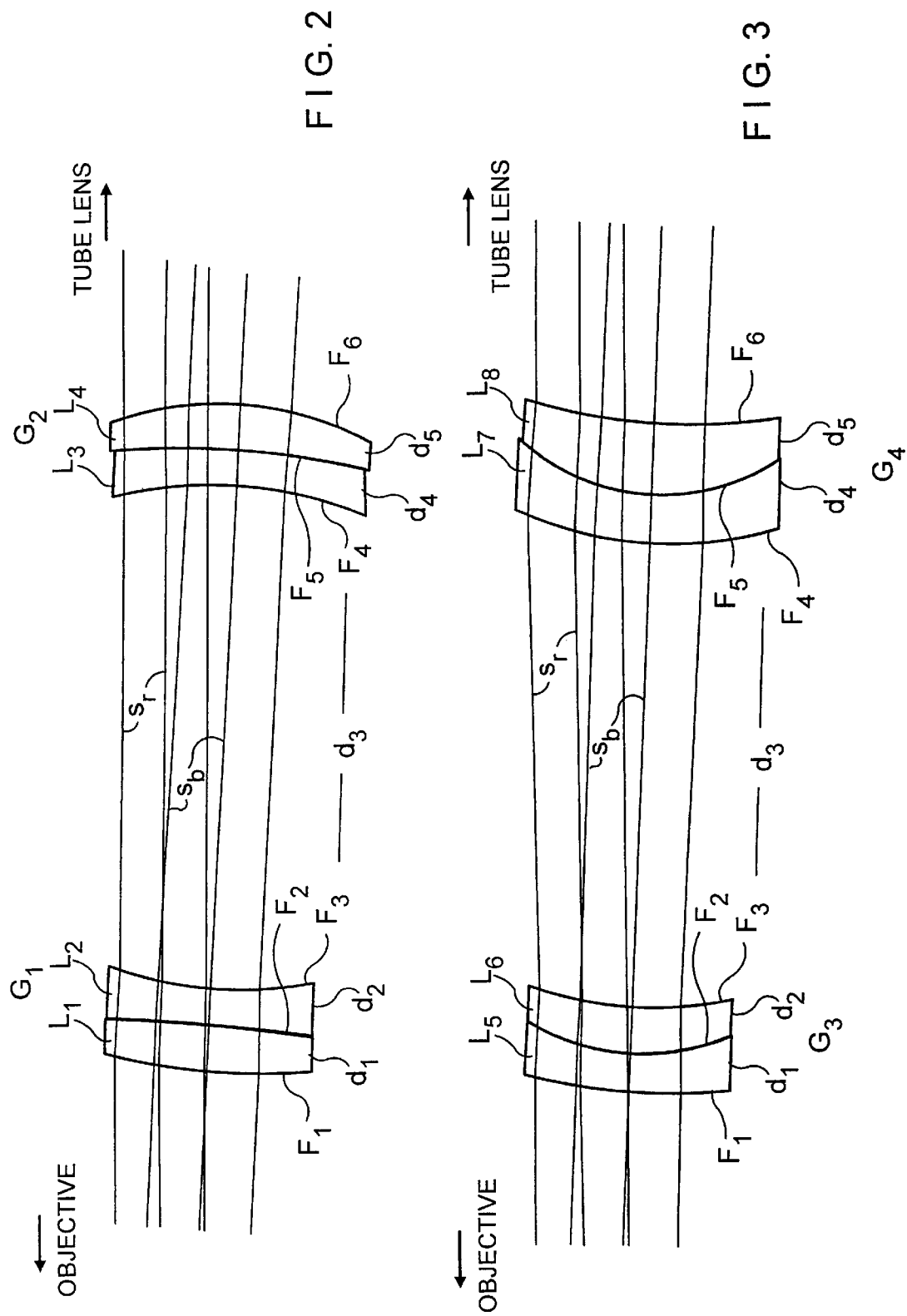

ARRANGEMENT FOR GENERATING A DEFINED LONGITUDINAL CHROMATIC ABERRATION IN THE OPTICAL BEAM PATH OF A CONFOCAL MICROSCOPE

BACKGROUND

A) Field of the Invention

The present invention relates to a confocal microscope, and more particularly to a confocal microscope which generates a defined longitudinal chromatic aberration in the optical beam path.

B) Description of Related Art

Optical systems containing lenses have image aberrations which can be corrected to varying degrees depending on the state of correction. However, there are also applications in which an optical system must have a predetermined longitudinal chromatic aberration at least in some areas without generating other image aberrations, especially transverse chromatic aberrations in the field of view, e.g., in devices provided for imaging object structures located at different depths in different colors in a fixed image plane.

For this purpose, WO 92/01965 discloses an objective with a high chromatic aberration in an arrangement for simultaneous confocal image generation. This is also the subject of DE - A1 4419940. Special objectives which must be free of image aberrations in other respects would have to be developed for these arrangements. "Handbook of Confocal Microscopy", Plenum Press, New York, London 1995, 263,264 discloses objectives which are likewise specially constructed. However, these objectives cannot be optimum with respect to numerical aperture.

The disadvantage of such specially constructed objectives is that they can only be used for this one purpose. Special objectives would have to be developed for different "surface profile types".

OBJECTS AND SUMMARY OF THE INVENTION

It is therefore an object of the present invention is to generate a predetermined longitudinal chromatic aberration in a microscope arrangement in an economical manner without bringing about other image aberrations.

This object is met by means of an arrangement having a confocal microscope and supplementary optics arranged in the imaging beam path of the microscope.

Supplementary optics are advantageously arranged between the objective and a tube lens for generating an intermediate image, wherein the object is imaged to infinity by the objective.

Supplementary optics according to the invention can likewise be provided downstream of an objective imaging the object directly in a confocal stop plane.

Thus the beams of every object point of a medium wavelength enter and then exit the supplementary optics in a parallel manner, wherein the beams of deeper object points of a longer wavelength and higher object points of a shorter wavelength also exit the supplementary optics in a parallel manner and are thus all sharply imaged in the image. Accordingly, the observer sees object points in different planes in various colors simultaneously and in sharp focus and thus perceives a substantially magnified depth of field.

The fact that beams of other wavelengths of other object depths not exiting in a parallel plays no part in the imaging lies at the heart of confocal imaging. That is, confocal imaging is characterized by a suitable construction such as the pinhole system of a Nipkow disk in the intermediate image or by a lens array which images only image points of small diameter from the intermediate image through a common pinhole stop.

In the supplementary optics according to the invention, a focal length of infinity is realized for a medium wavelength, e.g., 546 nm, a negative focal length is realized for longer wavelengths and a positive focal length is realized for shorter wavelengths, respectively, in the meter range for the above-mentioned case of the color-height correspondence on the microscope object (or conversely for the opposite correspondence).

Accordingly, in the case of a confocal microscope, object depth discrimination by means of color is not left to chance as regards objectives which are not completely color-corrected. Rather, very high-correction Epiplan-Apochromat objectives can be used, by means of which an exact correspondence of colors to object detail depths can be effected first, as in ground elevation sections by means of colors, e.g., blue=mountain tops, green=valley positions, red=below sea level, and, second, the colors can be well differentiated as spectral colors and not mixed colors of random residual longitudinal chromatic aberrations. In the optical system, according to the invention, for generating a predetermined longitudinal chromatic aberration, the other image aberrations, especially also transverse chromatic aberrations or chromatic difference in magnification, curvature, coma, astigmatism and distortion can be favorably corrected.

For optimum use in the microscope, the length of the supplementary optics should not exceed 30 mm if they are to be used, for example, as an exchangeable tube lens system. Further advantages and results of the invention are explained more fully in the following with reference to the embodiment examples shown in the drawings.

BRIEF DESCRIPTION OF THE DRAWINGS

The accompanying drawings are included to provide an understanding of the invention and constitute a part of the specification.

FIG. 2 shows the construction of supplementary optics according to the invention;

FIG. 3 shows the construction of further supplementary optics according to the invention; and, FIG. 4 shows single-element supplementary optics.

DETAILED DESCRIPTION OF THE INVENTION

Figure 1:
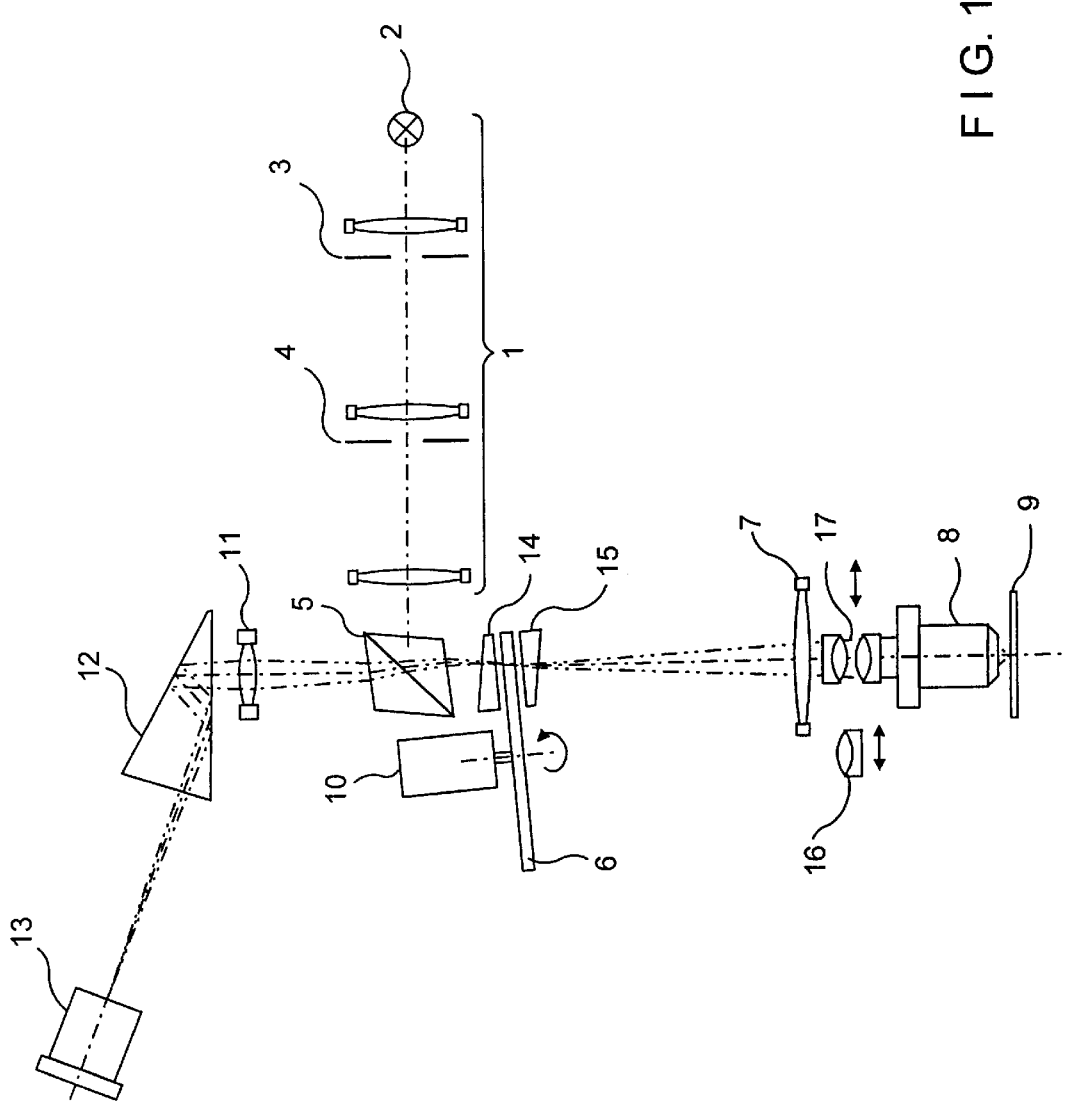
FIG. 1 shows the overall arrangement of a confocal direct-view microscope.

FIG. 1 shows an illuminating optics system 1 which contains a light source 2, a radiant field diaphragm 3 and an aperture stop 4. The illuminating light is guided, via a beam splitter 5, in the direction of a pinhole mask 6 which is arranged at an inclination in the optical beam path in the manner of a Nipkow disk. As such, an image of the radiant field diaphragm 3 is formed on the upper side of the pinhole mask 6.

The pinhole mask 6 and radiant field diaphragm 3 are imaged by a tube lens 7 and an objective 8 in the plane of an observed object 9 which is imaged back onto the pinhole mask (confocal imaging). The pinhole mask 6 is set in rotation by a motor 10 so that its pattern of pinholes moves over the object plane. The beams reflected by the object 9 pass again through the pinholes of the pinhole mask 6 and pass the beam splitter 5. The plane of the pinhole mask is imaged with the image of the object 9 via a lens 11 and a Bauernfeind prism 12 in an ocular 13.

Oppositely oriented wedge-shaped prisms 14, 15 are provided in the beam path upstream and downstream of the pinhole mask 6 and optically align the pinhole mask 6 in the beam path.

A one-element supplementary optics system 16 or two-element supplementary optics system 17 is arranged so as to be exchangeable and insertable between the objective 8 and the tube lens 7, where the object 9 is imaged to infinity by the objective 8.

In this way, the beams of every object point of a medium wavelength enter the supplementary optics 16 or 17 in a parallel manner and exit again in a parallel manner. Beams of deeper object points of a longer wavelength and higher object points of a shorter wavelength also exit the supplementary system in a parallel manner correspondingly and all are accordingly sharply imaged in the image. The fact that beams of other wavelengths of other object depths not exiting in parallel play no part in the imaging lies at the heart of confocal imaging. That is, confocal imaging is characterized by a suitable construction such as the pinhole system of a Nipkow disk in the intermediate image or by a lens array which images only image points of small diameter from the intermediate image through a common pinhole.

Figure 4:
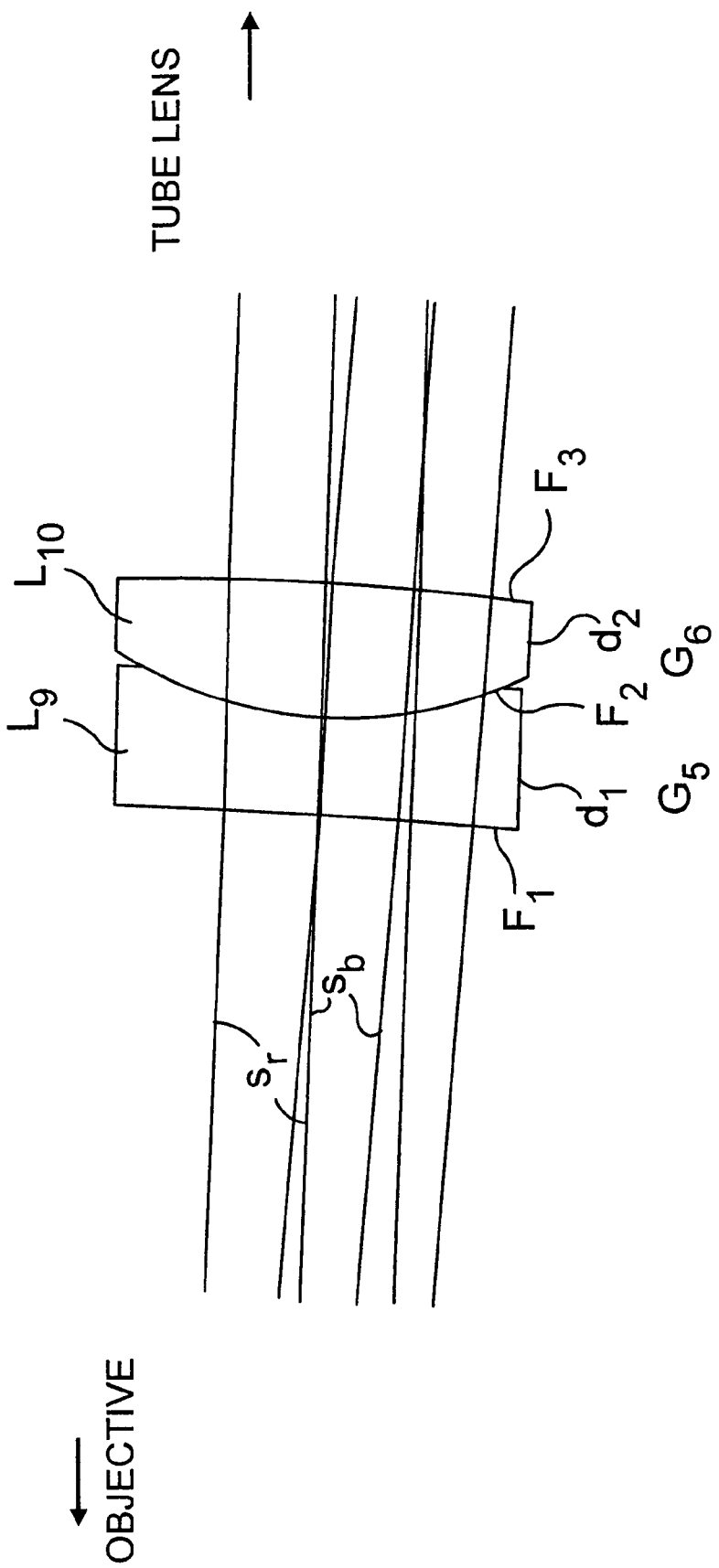

The supplementary optics shown in FIG. 2 and Table 1 below and in FIG. 3 and Table 2 below comprise two elements at a distance from one another of less than or equal to 30 mm including the lens thicknesses. Beams sb coming out of the center of the image and beams sr originating from the edge of the image are shown in FIGS. 2 to 4. It is also possible to use single-element supplementary optics comprising a lens component and generating a given chromatic aberration, but having residual aberrations in the chromatic magnification difference and in the field correction.

A single-element supplementary optics system is indicated by way of example in Table 4 below and in FIG. 4. In a single-element supplementary optics system, the colors diverge somewhat in the air space following the supplementary optics as is shown, for example, in FIG. 4. This can lead to an off-axis, different colored image.

On the other hand, the colors in the constructions according to FIGS. 2 and 3 are unified again by means of the second optical element so that only one color occurs for each image depth. The two elements according to FIGS. 2 and 3 have virtually (+/−5%) identical focal length with different mathematical signs and are constructed in a "mirror-inverted" manner, i.e., as is shown by way of example, they include a collecting or converging lens and a diverging lens which are configured in a mirror-symmetrical manner around a common center, but comprise opposite glass types, i.e., the converging lens of one element is formed of the same or similar glass as the diverging lens of the other element and has the same or similar focal length, but an opposite mathematical sign.

The lenses of each element are advantageously made, at least one each, from crown glass and flint glass, i.e., with a large and a small Abbe color dispersion number, which means that glass with a high Abbe number v greater than 40 and glass with a low Abbe number v of less than 40 is used.

As regards the basic action and the basic construction, the sequence in which the individual lenses of a component are arranged is unimportant. The glass types, thickness and radii also need not be identical, which fact can be made use of for adapting to different applications.

FIG. 3 and Table 2 indicate a system of this kind in which the sequence of crown glass and flint glass is switched; the elements are formed of different glasses and have different lens bending.

The optical effectiveness of this arrangement is shown in Table 3. The diverging lens of one element always compensates for the action of the converging lens of the other element due to the mirror-symmetrical construction, so that residual errors with respect to coma and astigmatism of a single lens component are eliminated. Furthermore, the curvature or null Petzval sum are infinite through the entire focal length.

Distortion is also compensated by the opposite mathematical signs of the focal lengths of the two elements. Chromatic aberrations such as chromatic coma and differences in chromatic magnification or color distortion due to the air separation between the two elements are eliminated in that each individual element has its own opposite and larger chromatic aberration than the desired total aberration. Because of different glass types in the mirror-symmetrical lenses and different geometric configuration, the desired chromatic aberration can be adjusted with an optimum field correction.

The example in Table 1 below comprises an element G1 of positive focal length with a first converging lens L1 and a first diverging lens L2, and an element G2 of negative focal length with a second diverging lens L3 followed by a second converging lens L4. The predetermined longitudinal chromatic aberration is given by the different radii of the elements.

By means of the advantageous dimensioning of the optical parameters, image aberrations such as color coma, astigmatism, Gaussian error and chromatic magnification difference are adequately corrected.

TABLE 1

Focal lengths, glass types, radii of curvature of surfaces F1–F6 and thicknesses d1–d5 for the first and second optical element G1, G2 of the supplementary optics comprising lenses L1, L2 and L3, L4 are shown in Table 1 below in accordance with FIG. 2

| Element No. | Focal Length | Lens. No. | Focal Length | Glass Type |
|---|---|---|---|---|
| G1 | +988 mm | L1 | +44.6 mm | SFL6 |
| G2 | −1007 mm | L2 | −45 mm | FK5 |
|  |  | L3 | −60.8 mm | SFL6 |
|  |  | L4 | +68.6 mm | FK5 |

| Surface No. | Radius | Thickness |
|---|---|---|
| F1 | 49.3 mm |  |
| d1 |  | 2 mm |
| F2 | −134.6 mm |  |
| d2 |  | 1.6 mm |
| F3 | 26.4 mm |  |
| d3 |  | 22.6 mm |
| F4 | −27.0 mm |  |
| d4 |  | 1.6 mm |
| F5 | −61.0 mm |  |
| d5 |  | 2 mm |
| F6 | −21.9 mm |  |

The supplementary optics system according to FIG. 3 comprises an optical element G3 of negative focal length and an optical element G4 of positive focal length formed of diverging lens L5, converging lens L6 and diverging lens L7 and converging lens L8. The given longitudinal chromatic aberration results from slightly different glasses in the two elements and from different radii.

TABLE 2

Focal lengths, glass types, radii of curvature of surfaces
F1–F6 and thicknesses d1–d5 for the first and second optical
elements G3, G4 of the supplementary optics comprising lenses
L5, L6 and L7, L8 are shown below in Table 2 in accordance
with FIG. 3

| Element No. | Focal Length | Lens. No. | Focal Length | Glass Type |
|---|---|---|---|---|
| G3 | −213 mm | L5 | −36 mm | BaK1 |
| G4 | +211 mm | L6 | +41 mm | SFL6 |
|  |  | L7 | −41 mm | SFL10 |
|  |  | L8 | +32 mm | Baf52 |

| Surface No. | Radius | Thickness |
|---|---|---|
| F1 | 51.6 mm |  |
| d1 |  | 1.6 mm |
| F2 | 14.6 mm |  |
| d2 |  | 2.1 mm |
| F3 | 24.4 mm |  |
| d3 |  | 20.8 mm |
| F4 | 26.0 mm |  |
| d4 |  | 2.2 mm |
| F5 | 13.4 mm |  |
| d5 |  | 3.2 mm |
| F6 | 38.7 mm |  |

TABLE 3

Differences of the object plane positions for four wavelengths
with different objective magnifications for the example according
to FIG. 3 and Table 2 are shown below in Table 3

| Magni- | Wavelength | | | |
|---|---|---|---|---|
| fication | 436 nm | 480 nm | 546 nm | 644 nm |
| 10X | 0.067 mm | 0.037 mm | 0 | −0.034 mm |
| 20X | 0.017 mm | 0.0093 mm | 0 | −0.0084 mm |
| 50X | 0.0027 mm | 0.0015 mm | 0 | −0.0013 mm |
| 100X | 0.00067 mm | 0.00037 mm | 0 | −0.00034 mm |
| 150X | 0.00030 mm | 0.00016 mm | 0 | −0.00015 mm |

TABLE 4

The construction comprising two lenses L9 and L10 is shown
below in Table 4

| Total Focal Length | Lens No. | Focal Length | Glass Type | Abbe No. |
|---|---|---|---|---|
| 44581 mm | L9 | −21.52 mm | BaF52 | 46.1 |
|  | L10 | 21.98 mm | F5 | 37.8 |

| Surface No. | Radius | Thickness |
|---|---|---|
| F1 | −110.593 mm |  |
| d1 |  | 2.5 mm |
| F2 | 15.070 mm |  |
| d2 |  | 3.6 mm |
| F3 | −105.929 mm |  |

The present invention is not restricted to the embodiment forms shown above. In particular, supplementary optics of different constructions can be used which, for example, are diffractive elements or glass plates. Additional advantages and modifications, which will readily occur to those skilled in the art from consideration of the specification and practice of the invention, are intended to be within the scope and spirit of the following claims.

I claim:
1. An arrangement for generating a defined longitudinal chromatic aberration in a beam path of a confocal microscope, said arrangement comprising:
a confocal microscope including a lens which generates an intermediate image and a microscope objective which images an object to infinity; and
supplementary optics arranged in an imaging beam path between said lens and said microscope objective, said supplementary optics having a longitudinal chromatic aberration and a plurality of dual lens optical elements,
each of said dual lens optical elements having a converging lens and a diverging lens of different materials, said converging lens of a first of said dual lens optical elements having a glass type that corresponds to a glass type of said diverging lens of a second of said dual lens optical elements, and said converging lens of said second of said dual lens optical elements having a glass type that corresponds to a glass type of said diverging lens of said first of said dual lens optical elements, the first and second dual lens optical elements having the same focal length with different mathematical signs with a deviation of +/−5%.

2. An arrangement for generating a defined longitudinal chromatic aberration in a beam path of a confocal microscope, said arrangement comprising:
a confocal microscope including a lens which generates an intermediate image and a microscope objective which images an object to infinity; and
supplementary optics arranged in an imaging beam path between said lens and said microscope objective, said supplementary optics having a longitudinal chromatic aberration and a plurality of dual lens optical elements,
each of said dual lens optical elements having a converging lens and a diverging lens of different materials, said converging lens of a first of said dual lens optical elements having a glass type that corresponds to a glass type of said diverging lens of a second of said dual lens optical elements, and said converging lens of said second of said dual lens optical elements having a glass type that corresponds to a glass type of said diverging lens of said first of said dual lens optical elements, a distance between the first and second optical elements in the supplementary optics being less than 30 mm.

3. An arrangement for generating a defined longitudinal chromatic aberration in a beam path of a confocal microscope, said arrangement comprising:
a confocal microscope including a lens which generates an intermediate image and a microscope objective which images an object to infinity; and
supplementary optics arranged in an imaging beam path between said lens and said microscope objective, said supplementary optics having a longitudinal chromatic aberration and a plurality of dual lens optical elements,
each of said dual lens optical elements having a converging lens and a diverging lens of different materials, said converging lens of a first of said dual lens optical elements having a glass type that corresponds to a glass type of said diverging lens of a second of said dual lens optical elements, and said converging lens of said second of said dual lens optical elements having a glass type that corresponds to a glass type of said diverging lens of said first of said dual optical elements, the following specifications being used for focal lengths, glass types, radii of curvature of surfaces F and thicknesses d for first and second optical elements G1, G2 of the supplementary optics comprising lenses L1, L2 and L3, L4:

| Element No. | Focal Length | Lens. No | Focal Length | Glass type |
|---|---|---|---|---|
| G1 | +988 mm | L1 | +44.6 mm | SFL6 |
| G2 | −1007 mm | L2 | −45 mm | FK5 |
|  |  | L3 | −60.8 mm | SFL6 |
|  |  | L4 | +68.6 mm | FK5 |

| Surface No. | Radius | Thickness |
|---|---|---|
| F1 | 49.3 mm |  |
| d1 |  | 2 mm |
| F2 | −134.6 mm |  |
| d2 |  | 1.6 mm |
| F3 | 26.4 mm |  |
| d3 |  | 22.6 mm |
| F4 | −27.0 mm |  |
| d4 |  | 1.6 mm |
| F5 | −61.0 mm |  |
| d5 |  | 2 mm |
| F6 | −21.9 mm |  |

4. An arrangement for generating a defined longitudinal chromatic aberration in a beam path of a confocal microscope, said arrangement comprising:
   a confocal microscope including a lens which generates an intermediate image and a microscope objective which images an object to infinity; and
   supplementary optics arranged in an imaging beam path between said lens and said microscope objective, said supplementary optics having a longitudinal chromatic aberration and a plurality of dual lens optical elements, each of said dual lens optical elements having a converging lens and a diverging lens of different materials, said converging lens of a first of said dual lens optical elements having a glass type that corresponds to a glass type of said diverging lens of a second of said dual lens optical elements, and said converging lens of said second of said dual lens optical elements having a glass type that corresponds to a glass type of said diverging lens of said first of said dual lens optical elements, the following specifications being used for focal lengths, glass types, radii of curvature of surfaces F and thicknesses d for first and second optical elements G3, G4 of the supplementary optics comprising lenses L5, L6 and L7, L8:

| Element No. | Focal Length | Lens. No. | Focal Length | Glass type |
|---|---|---|---|---|
| G3 | −213 mm | L5 | −36 mm | BaK1 |
| G4 | +211 mm | L6 | +41 mm | SFL6 |
|  |  | L7 | −41 mm | SFL10 |
|  |  | L8 | +32 mm | Baf52 |

| Surface No. | Radius | Thickness |
|---|---|---|
| F1 | 51.6 mm |  |
| d1 |  | 1.6 mm |
| F2 | 14.6 mm |  |
| d2 |  | 2.1 mm |
| F3 | 24.4 mm |  |
| d3 |  | 20.8 mm |
| F4 | 26.0 mm |  |
| d4 |  | 2.2 mm |
| F5 | 13.4 mm |  |
| d5 |  | 3.2 mm |
| F6 | 33.7 mm |  |

* * * * *